(12) United States Patent
Hadley

(10) Patent No.: US 9,465,755 B2
(45) Date of Patent: Oct. 11, 2016

(54) SECURITY PARAMETER ZEROIZATION

(75) Inventor: Ted A. Hadley, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/233,321

(22) PCT Filed: Dec. 15, 2011

(86) PCT No.: PCT/US2011/065066
§ 371 (c)(1),
(2), (4) Date: Jan. 16, 2014

(87) PCT Pub. No.: WO2013/012435
PCT Pub. Date: Jan. 24, 2013

(65) Prior Publication Data
US 2014/0165206 A1 Jun. 12, 2014

Related U.S. Application Data

(60) Provisional application No. 61/509,078, filed on Jul. 18, 2011.

(51) Int. Cl.
*G06F 21/78* (2013.01)
*G06F 13/16* (2006.01)
(Continued)

(52) U.S. Cl.
CPC ............ *G06F 13/1642* (2013.01); *G06F 1/24* (2013.01); *G06F 11/2284* (2013.01); *G06F 12/1433* (2013.01); *G06F 12/1483* (2013.01); *G06F 13/1663* (2013.01); *G06F 21/54* (2013.01); *G06F 21/55* (2013.01); *G06F 21/57* (2013.01); *G06F 21/575* (2013.01); *G06F 21/602* (2013.01); *G06F 21/72* (2013.01); *G06F 21/74* (2013.01); *G06F 21/75* (2013.01); *G06F 21/78* (2013.01); *G06F 21/79* (2013.01); *G09C 1/00* (2013.01); *H04L 9/088* (2013.01);
(Continued)

(58) Field of Classification Search
CPC ...................................................... G06F 21/78
USPC .......................................................... 726/25
See application file for complete search history.

(56) References Cited

U.S. PATENT DOCUMENTS 3,183,498 A 5/1965 Howe et al.
5,131,040 A 7/1992 Knapczyk
(Continued)

FOREIGN PATENT DOCUMENTS

CN 1650183 A 8/2005
CN 101995301 3/2011
(Continued)

OTHER PUBLICATIONS

"ARM Security Technology Building a Secure System Using TrustZone® Technology", < http://infocenter.arm.com/help/topic/com.arm.doc.prd29-genc-009492c/PRD29-GENC-009492C_trustzone_security_whitepaper.pdf > Issue: C, 2009.
(Continued)

*Primary Examiner* — William Powers
(74) *Attorney, Agent, or Firm* — Hewlett Packard Enterprise Patent Department

(57) ABSTRACT

Example embodiments disclosed herein relate to security parameter zeroization. Example embodiments include security parameter zeroization based on a remote security monitor.

15 Claims, 5 Drawing Sheets

(51) Int. Cl.

| | |
|---|---|
| *H04L 9/32* | (2006.01) |
| *G06F 21/54* | (2013.01) |
| *G06F 21/75* | (2013.01) |
| *H04L 9/08* | (2006.01) |
| *G06F 1/24* | (2006.01) |
| *G06F 21/57* | (2013.01) |
| *G06F 12/14* | (2006.01) |
| *G06F 21/60* | (2013.01) |
| *G06F 21/55* | (2013.01) |
| *G06F 21/72* | (2013.01) |
| *G06F 21/79* | (2013.01) |
| *G09C 1/00* | (2006.01) |
| *G06F 11/22* | (2006.01) |
| *G06F 21/74* | (2013.01) |
| *G01R 31/317* | (2006.01) |

(52) U.S. Cl.
CPC .............. *H04L 9/0816* (2013.01); *H04L 9/32* (2013.01); *G01R 31/31719* (2013.01); *G06F 2221/2143* (2013.01); *H04L 2209/12* (2013.01)

(56) References Cited

U.S. PATENT DOCUMENTS

| | | | |
|---|---|---|---|
| 5,214,760 A | 5/1993 | Hammond et al. | |
| 5,249,286 A | 9/1993 | Alpert et al. | |
| 5,379,378 A | 1/1995 | Peters et al. | |
| 5,406,630 A | 4/1995 | Piosenka et al. | |
| 5,469,564 A | 11/1995 | Junya | |
| 5,497,497 A | 3/1996 | Miller et al. | |
| 5,568,529 A | 10/1996 | Masuda | |
| 5,600,576 A | 2/1997 | Broadwater et al. | |
| 5,682,328 A | 10/1997 | Roeber et al. | |
| 5,825,878 A | 10/1998 | Takahashi et al. | |
| 5,872,967 A | 2/1999 | DeRoo et al. | |
| 5,937,063 A | 8/1999 | Davis | |
| 6,078,873 A | 6/2000 | Shutty et al. | |
| 6,148,362 A * | 11/2000 | Sagi | 711/102 |
| 6,188,603 B1 | 2/2001 | Takeda | |
| 6,243,812 B1 * | 6/2001 | Matyas et al. | 713/172 |
| 6,292,898 B1 | 9/2001 | Sutherland | |
| 6,377,691 B1 | 4/2002 | Swift et al. | |
| 6,424,143 B1 | 7/2002 | Blossfeld et al. | |
| 6,466,048 B1 | 10/2002 | Goodman | |
| 6,553,492 B1 | 4/2003 | Hosoe | |
| 6,553,496 B1 * | 4/2003 | Buer | 726/34 |
| 6,625,727 B1 | 9/2003 | Moyer et al. | |
| 6,687,140 B2 | 2/2004 | Kitamura | |
| 6,704,865 B1 | 3/2004 | Duff | |
| 6,789,182 B1 | 9/2004 | Brothers et al. | |
| 6,835,579 B2 | 12/2004 | Elward | |
| 6,836,548 B1 | 12/2004 | Anderson et al. | |
| 6,859,876 B2 | 2/2005 | Dykes et al. | |
| 6,910,094 B1 | 6/2005 | Eslinger et al. | |
| 6,928,551 B1 | 8/2005 | Lee et al. | |
| 7,039,816 B2 | 5/2006 | Kocher et al. | |
| 7,057,396 B2 | 6/2006 | Nagase | |
| 7,062,615 B2 | 6/2006 | Miller et al. | |
| 7,107,459 B2 | 9/2006 | Caronni et al. | |
| 7,218,567 B1 | 5/2007 | Trimberger et al. | |
| 7,222,053 B2 | 5/2007 | Snyder et al. | |
| 7,237,121 B2 | 6/2007 | Cammack et al. | |
| 7,299,365 B2 | 11/2007 | Evans | |
| 7,305,534 B2 | 12/2007 | Watt et al. | |
| 7,360,073 B1 | 4/2008 | Billstrom et al. | |
| 7,398,441 B1 | 7/2008 | Gee | |
| 7,423,529 B2 | 9/2008 | Singer et al. | |
| 7,424,398 B2 | 9/2008 | Booth et al. | |
| 7,457,960 B2 | 11/2008 | Kablotsky | |
| 7,512,719 B1 | 3/2009 | Gillespie | |
| 7,525,836 B2 | 4/2009 | Backus et al. | |
| 7,549,064 B2 | 6/2009 | Elbert et al. | |
| 7,568,112 B2 | 7/2009 | Yamaguchi | |
| 7,571,475 B2 | 8/2009 | Moon | |
| 7,580,919 B1 | 8/2009 | Hannel et al. | |
| 7,657,760 B2 | 2/2010 | Teramoto et al. | |
| 7,667,997 B2 | 2/2010 | Rodriguez | |
| 7,681,024 B2 | 3/2010 | Kwon | |
| 7,729,156 B2 | 6/2010 | Rodriguez et al. | |
| 7,733,250 B1 | 6/2010 | Tsyrganovich | |
| 7,757,098 B2 | 7/2010 | Brannock et al. | |
| 7,761,904 B2 * | 7/2010 | Hessel et al. | 726/2 |
| 7,774,619 B2 | 8/2010 | Paaske et al. | |
| 7,831,839 B2 | 11/2010 | Hatakeyama | |
| 7,844,835 B2 | 11/2010 | Ginter et al. | |
| 7,937,596 B2 | 5/2011 | Mackey et al. | |
| 7,949,912 B1 | 5/2011 | Trimberger | |
| 7,954,153 B2 | 5/2011 | Bancel et al. | |
| 7,966,467 B1 | 6/2011 | Ludloff et al. | |
| 8,027,927 B2 | 9/2011 | Ogg et al. | |
| 8,046,574 B2 | 10/2011 | Dale et al. | |
| 8,621,597 B1 * | 12/2013 | Jenkins, IV | 726/14 |
| 2001/0010086 A1 | 7/2001 | Katayama et al. | |
| 2002/0120851 A1 | 8/2002 | Clarke | |
| 2002/0129195 A1 | 9/2002 | Hongo et al. | |
| 2003/0133574 A1 | 7/2003 | Caronni et al. | |
| 2003/0140228 A1 | 7/2003 | Binder | |
| 2003/0200453 A1 | 10/2003 | Foster et al. | |
| 2003/0200454 A1 | 10/2003 | Foster et al. | |
| 2004/0078664 A1 | 4/2004 | Takahashi | |
| 2004/0088333 A1 | 5/2004 | Sidman | |
| 2004/0153593 A1 | 8/2004 | Watt et al. | |
| 2004/0210764 A1 | 10/2004 | McGrath et al. | |
| 2004/0267847 A1 * | 12/2004 | Harper | 708/250 |
| 2005/0091554 A1 | 4/2005 | Loukianov | |
| 2005/0144358 A1 | 6/2005 | Conley et al. | |
| 2005/0235166 A1 | 10/2005 | England et al. | |
| 2006/0010356 A1 | 1/2006 | Snyder et al. | |
| 2006/0023486 A1 | 2/2006 | Furusawa et al. | |
| 2006/0031685 A1 | 2/2006 | Chen et al. | |
| 2006/0059373 A1 | 3/2006 | Fayad et al. | |
| 2006/0090084 A1 | 4/2006 | Buer | |
| 2006/0095726 A1 | 5/2006 | Zaabab et al. | |
| 2006/0101241 A1 | 5/2006 | Curran et al. | |
| 2006/0168212 A1 | 7/2006 | Parsons et al. | |
| 2006/0179302 A1 | 8/2006 | Hatakeyama | |
| 2006/0179324 A1 | 8/2006 | Hatakeyama | |
| 2006/0184791 A1 | 8/2006 | Schain et al. | |
| 2006/0208884 A1 | 9/2006 | Diamant | |
| 2006/0215437 A1 | 9/2006 | Trika et al. | |
| 2006/0225142 A1 * | 10/2006 | Moon | 726/34 |
| 2007/0067644 A1 | 3/2007 | Flynn et al. | |
| 2007/0136606 A1 | 6/2007 | Mizuno | |
| 2007/0140477 A1 | 6/2007 | Wise | |
| 2007/0174909 A1 | 7/2007 | Curchett et al. | |
| 2007/0192610 A1 | 8/2007 | Chun et al. | |
| 2007/0204170 A1 | 8/2007 | Oren et al. | |
| 2007/0237325 A1 | 10/2007 | Gershowitz et al. | |
| 2007/0283140 A1 | 12/2007 | Jones et al. | |
| 2008/0005586 A1 | 1/2008 | Munguia | |
| 2008/0010567 A1 | 1/2008 | Hughes et al. | |
| 2008/0072018 A1 | 3/2008 | Le et al. | |
| 2008/0112405 A1 | 5/2008 | Cholas et al. | |
| 2008/0137848 A1 | 6/2008 | Kocher et al. | |
| 2008/0162848 A1 | 7/2008 | Broyles et al. | |
| 2008/0165952 A1 | 7/2008 | Smith et al. | |
| 2008/0172538 A1 | 7/2008 | Dice et al. | |
| 2008/0184038 A1 | 7/2008 | Fitton | |
| 2008/0276092 A1 | 11/2008 | Eberhardt et al. | |
| 2008/0282345 A1 | 11/2008 | Beals | |
| 2009/0031135 A1 | 1/2009 | Kothandaraman | |
| 2009/0055637 A1 | 2/2009 | Holm et al. | |
| 2009/0138699 A1 | 5/2009 | Miyazaki et al. | |
| 2009/0150546 A1 | 6/2009 | Ryan | |
| 2009/0150662 A1 | 6/2009 | Desselle et al. | |
| 2009/0154705 A1 | 6/2009 | Price et al. | |
| 2009/0172496 A1 | 7/2009 | Roine | |
| 2009/0196418 A1 | 8/2009 | Tkacik et al. | |
| 2009/0259854 A1 | 10/2009 | Cox et al. | |
| 2009/0262940 A1 | 10/2009 | Lim | |
| 2009/0271619 A1 | 10/2009 | Fujii et al. | |
| 2009/0290712 A1 | 11/2009 | Henry et al. | |

(56) References Cited

U.S. PATENT DOCUMENTS

| | | | |
|---|---|---|---|
| 2009/0292732 | A1 | 11/2009 | Manolescu et al. |
| 2009/0293130 | A1 | 11/2009 | Henry et al. |
| 2009/0328201 | A1 | 12/2009 | Jin et al. |
| 2010/0057960 | A1 | 3/2010 | Renno |
| 2010/0064125 | A1 | 3/2010 | Liu et al. |
| 2010/0088739 | A1 | 4/2010 | Hall et al. |
| 2010/0268942 | A1 | 10/2010 | Hernandez-Ardieta et al. |
| 2010/0312940 | A1 | 12/2010 | Shinohara |
| 2011/0012709 | A1 | 1/2011 | Payson et al. |
| 2011/0026831 | A1 | 2/2011 | Perronnin et al. |
| 2011/0095776 | A1 | 4/2011 | Yunoki |
| 2011/0116635 | A1 | 5/2011 | Bar-el |
| 2011/0154501 | A1 | 6/2011 | Banginwar |
| 2012/0185636 | A1* | 7/2012 | Leon et al. .............. 711/102 |
| 2012/0224691 | A1 | 9/2012 | Purohit |
| 2012/0246432 | A1 | 9/2012 | Hadley et al. |
| 2013/0024637 | A1 | 1/2013 | Hadley |
| 2013/0024716 | A1 | 1/2013 | Hadley |
| 2013/0031290 | A1 | 1/2013 | Schwartz et al. |
| 2013/0305380 | A1 | 11/2013 | Diehl et al. |
| 2014/0130189 | A1 | 5/2014 | Hadley |
| 2014/0140512 | A1 | 5/2014 | Hadley |
| 2014/0149729 | A1 | 5/2014 | Hadley |
| 2014/0156961 | A1 | 6/2014 | Hadley |
| 2014/0165206 | A1* | 6/2014 | Hadley .................... 726/25 |
| 2014/0358949 | A1 | 12/2014 | Hu |

FOREIGN PATENT DOCUMENTS

| | | |
|---|---|---|
| EP | 0987625 | 3/2000 |
| JP | 1201762 | 8/1989 |
| JP | 06-028885 | 2/1994 |
| JP | 08-069697 | 3/1996 |
| JP | 1131068 | 2/1999 |
| JP | 2008192036 | 8/2008 |
| WO | WO-9745960 A1 | 12/1997 |
| WO | WO-9931665 | 6/1999 |

OTHER PUBLICATIONS

Anderson, R. et al., "Cryptographic Processors—A Survey," Proceedings of the IEEE, vol. 94, No. 2, Feb. 2006, pp. 357-369.

Bialas; "Intelligent Sensors Security", Sensors, Institute of Innovative Technologies EMAG, 40-189 Katowice, ul. Leopolda 31, Poland, ISSN 1424-8220, Jan. 22, 2010. <www.mdpi.com/journal/sensors>.

Datta et al.; "Calibration of On-Chip Thermal Sensors using Process Monitoring Circuits", University of Massachusetts, Amherst, MA USA, IEEE 978-1-4244-6455-5/10, 2010.

Fields, et al; "Cryptographic Key Protection Module in Hardware for the Need2know System", < http://ieeexplore.ieee.org/stamp/stamp.jsp?arnumber=1594225 > on pp. 814-817; vol. 1, Aug 7-10, 2005.

Gilmont, et al; "An Architecture of Security Management Unit for Safe Hosting of Multiple Agents", < http://citeseerx.ist.psu.edu/viewdoc/summary?doi=10.1.121.3663 > On pp. 79-82, 1998.

International Search Report and Written Opinion received in PCT Application No. PCT/US2011/065081, mailed Jul. 25, 2012, 9 pgs.

International Search Report and Written Opinion received in PCT Application No. PCT/US2011/066750, mailed on Sep. 20, 2012, 10 pgs.

International Search Report and Written Opinion received in PCT Application No. PCT/US2012/020528, mailed Aug. 22, 2012, 9 pgs.

International Search Report and Written Opinion received in PCT Application No. PCT/US2012/023385, mailed May 22, 2012, 10 pgs.

International Search Report and Written Opinion received in Pot Application No. PCT/US2012/023794, mailed Sep. 24, 2012, 9 pgs.

International Search Report and Written Opinion received in Pot Application No. PCT/US2012/024367, mailed Jul. 18, 2012, 10 pgs.

International Search Report and Written Opinion received in Pot Application No. PCT/US2012/031542, mailed Sep. 27, 2012, 9 pgs.

International Search Report and Written Opinion received in PCT Application No. PCT/US2012/065066, mailed Jul. 16, 2012, 9 pgs.

Sun Microsystems, "Sun Cryptographic Accelerator 4000", Firmware Version 1.1, FIPS 140-2 Non-Proprietary, Security Policy, Level 3 Validation, Aug. 6, 2004, pp. 1-20, <oracle.com/technetwork/topics/security/140sp457-160924.pdf>.

Yang, et al; "Improving Memory Encryption Performance in Secure Processors", < http://ieeexplore.ieee.org/stamp/stamp.jsp?arnumber=1407851 > On pp. 630-640; vol. 54; Issue: 5, May 2005.

Yao, et al.; "Calibrating On-chip Thermal Sensors in Integrated Circuits: A Design-for-Calibration Approach", Springer Science+Business Media, LLC 2011, Sep. 21, 2011.

Cengage Learning, "The Hexadecimal Number System and Memory Addressing," May 16, 2011, <http://web.archive.org/web/20110516210838/http://college.cengage.com/coursemate/technology_education/andrews_9781435497788/unprotected/book_level/The_Hexadecimial_Number_System_and_Memory_Addressing.pdf.

D. Ibrahim, "Design of a multichannel temperature data logger with SD card storage," Electronics World, Feb. 2009, <http://www.mikroe.com/downloads/get/789/data_logger_ew_02_09.pdf>.

Dedrick et al., "An inexpensive, microprocessor-based, data logging system," Computers & Geosciences, 2000, vol. 26, pp. 1059-1066.

Hobbizine, "adding memory with i2c eeproms," May 16, 2010, (web page), <http://picaxe.hobbizine.com/eeprom.html>.

Limor, "Logger Shield: Datalogging for Arduino," (web page), May 17, 2011, <http://www.ladyada.net/make/logshield/index.html>.

Maxim Integrated Products, "DS1678 Real-Time Event Recorder," 2005, <http://datasheets.maximintegrated.com/en/ds/DS1678.pdf>.

Microsoft Corp., "BitLocker Drive Encryption: Scenarios, User Experience, and Flow," May 16, 2006, available at: <http://msdn.microsoft.com/en-us/library/windows/hardware/gg463165.aspx>.

Microsoft Corp., "BitLocker Drive Encryption: Technical Overview," May 16, 2006.

Microsoft, "How To: Configure MachineKey in ASP.Net 2.0," available Mar. 9, 2012, <http://msdn.microsoft.com/en-us/library/ff649308.aspx>.

National Institute of Standards and Technology, "Security Requirements for Cryptographic Modules," FIPS PUB 140-2, May 25, 2001, <http://csrc.nist.gov/publications/fips/fips140-2/fips1402.pdf>.

National Institute of Standards and Technology, "Security Requirements for Cryptographic Modules," FIPS PUB 140-3, Draft, p. 16, Sep. 11, 2009, and Annexes A-G <http://csrc.nist.gov/publications/PubsDrafts.html#FIPS-140--3>.

Raafat. S. Habeeb, "Design a Programmable Sequence Controller Utilizing I2C BUS," 2011, Journal of Madenat Alelem College, vol. 3, iss. 2, pp. 5-25, <http://www.iasj.net/iasj?func=fulltext&ald=60778>.

Revolution Education Ltd., "Picaxe Datalogger (AXE110P)," version 2.0, (web page), Dec. 2010, <http://www.picaxe.com/docs/axe110.pdf>.

Rick Smith, "Authentication," (excerpt), Feb. 2002, <http://www.visi.com/crypto/>.

ViaSat, Inc., "Requirements Description for an Advanced Cryptographic Module (ACM) to Support the High Capacity Communications Capability (HC3)," Technical Report, Oct. 18, 2005, <http://cryptome.org/acm-hc3.htm>.

Supplementary Partial European Search Report, European Patent Application No. 12814434.2, Jan. 28, 2016, 10 pages.

* cited by examiner

SECURITY PARAMETER ZEROIZATION

CROSS-REFERENCE TO RELATED APPLICATIONS

This application claims priority to U.S. provisional patent application No. 61/509,078, filed on Jul. 18, 2011, which is hereby incorporated by reference herein in its entirety.

BACKGROUND

A computing device, such as a device including a processor, may interact with secret or otherwise sensitive information during operation. As such, some computing devices may operate to protect the sensitive information. For example, a computing device may encrypt sensitive information using a security parameter, such as an encryption key, stored on the device.

BRIEF DESCRIPTION OF THE DRAWINGS

The following detailed description references the drawings, wherein.

DETAILED DESCRIPTION

Figure 1:
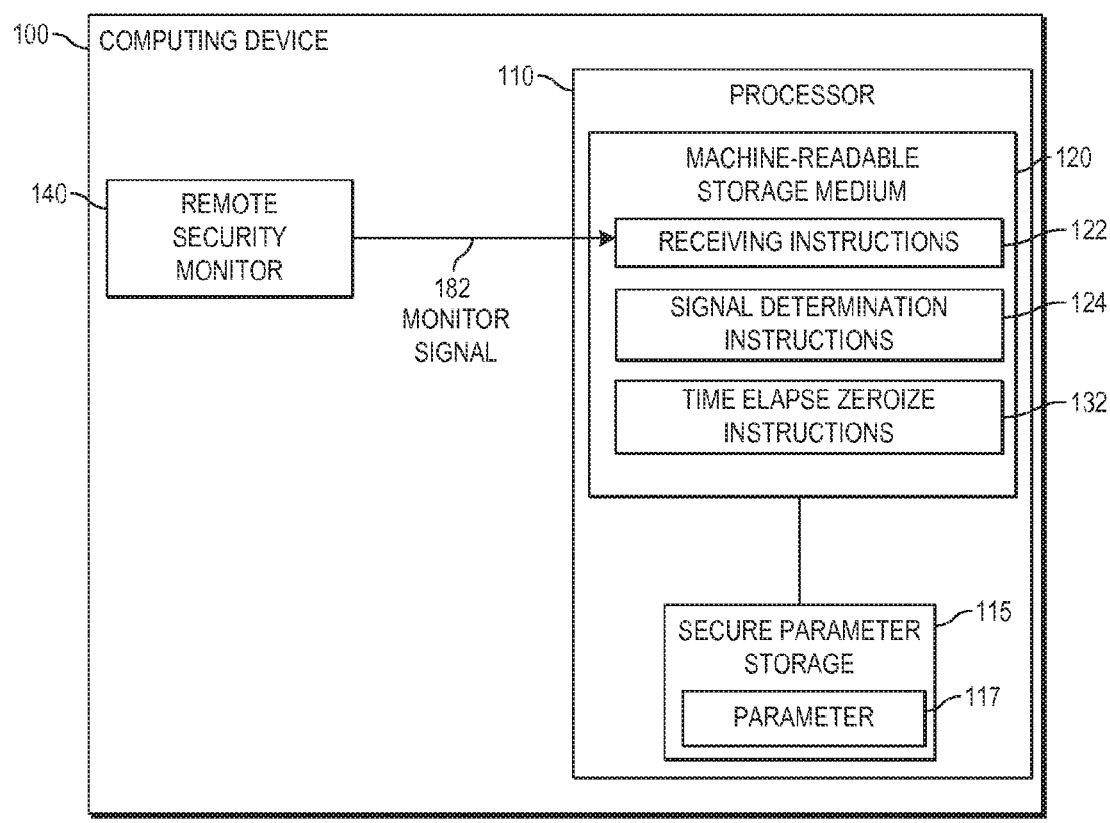
FIG. 1 is a block diagram of an example computing device to zeroize a security parameter.

As noted above, a computing device may operate to protect sensitive information using a security parameter stored on the computing device. For example, a computing device may encrypt information using security parameters such as secret encryption keys. If the security parameters of the computing device were to be discovered, the security parameters may subsequently be used to discover sensitive information used by the computing device or another device utilizing the same security parameters.

Accordingly, a computing device utilizing security parameters may operate to protect the security parameters stored on the device. For example, the computing device may zeroize (e.g., erase, overwrite, etc.) security parameters stored on the device in response to the detection of a security incident. By removing the security parameters from the computing device in response to such a detection, the device may eliminate the parameters before they become vulnerable to discovery as a result of the security incident. In this manner, the secrecy of the parameters may be maintained despite the security incident. For example, in response to an attempted or actual attack on the device, the device may zeroize the security parameters before any security parameter is retrieved from the device, thereby maintaining the secrecy of the parameters despite the attack.

In some computing devices, the security parameters may be stored on a processor within the computing device, and the detection of a security incident may be made by the processor itself. In such devices, the processor may zeroize security parameters stored on the processor in response to its own security incident detection functionalities. Such a computing device may also include security monitors external to the processor. For example, a computing device may include a case or other enclosure in which the processor is disposed, along with other components of the device, and may monitor physical conditions of the enclosure with a security monitor external to the processor. In such a device, the security monitor may provide a zeroization command to the processor in response to detecting a security incident involving the enclosure. The processor may then zeroize its security parameters in response to the zeroization command to maintain the secrecy of the processor's security parameters.

However, the connection between the security monitor and the processor may be vulnerable. For example, the connection between the security monitor and the processor may become disconnected or otherwise corrupted such that zeroize commands output by the security monitor either do not reach the processor or are not recognizable by the processor. As one example, an attacker may tamper with the connection through an opening in the device enclosure, or when the enclosure security is disabled, such as during device maintenance. In other examples, the connection may become disconnected or corrupted as a result of movement, wear and tear, and the like. When the connection disconnected or corrupted as described above, the processor will fail to zeroize its security parameters when the security monitor detects a security incident, which may increase the vulnerability of information on the computing device.

To address these issues, examples disclosed herein may zeroize a security parameter stored on a processor if the processor does not receive a periodic idle signal from a security monitor remote from the processor. In some examples, the remote security monitor may periodically provide an idle signal to the processor if the security monitor detects no security incidents and provide a zeroize signal to the processor when a security incident is detected. In such examples, the processor may determine whether a received signal is an idle signal from the security monitor and zeroize a security parameter stored on the processor if a threshold amount of time elapses without receiving an idle signal from the security monitor.

In such examples, the processor may use the periodic idle signal to confirm that the connection between the remote security monitor and the processor is connected and not corrupted. For example, if the remote security monitor and the processor are disconnected, the idle signal output by the security monitor will not reach the processor. Additionally, if the connection is corrupted, a valid idle signal may not reach the processor. In such examples, after a threshold amount of time passes without receiving a valid idle signal, the processor may determine that the remote security monitor is disconnected or malfunctioning and may zeroize a security parameter stored on the processor. In this manner, examples disclosed herein may provide security for the connection between a remote security monitor and the processor and reduce the likelihood of security parameters being left vulnerable by disconnection or corruption of a connection between a processor and a remote security monitor.

Referring now to the drawings, FIG. 1 is a block diagram of an example computing device 100 to zeroize a security parameter 117. As used herein, a "computing device" may be a desktop or notebook computer, a tablet computer, a computer networking device (e.g., a hardware security module, etc.), a server, or any other device or equipment (e.g., an automated teller machine (ATM), etc.) including a processor. In some examples, computing device 100 may be any of the devices noted above.

In the example of FIG. 1, computing device 100 includes a processor 110. As used herein, a "processor" may be at least one integrated circuit (IC), such as a semiconductor-based microprocessor, including at least one of a central processing unit (CPU), a graphics processing unit (GPU), a field-programmable gate array (FPGA) configured to retrieve and execute instructions stored on a machine-readable storage medium, other electronic circuitry suitable for the retrieval and execution of such instructions, or a combination thereof. In the example of FIG. 1, processor 110 includes secure parameter storage 115. As used herein, "storage" may be any type of memory or other electronic circuitry for storing data in any suitable format. In some examples, secure parameter storage 115 may store at least one security parameter 117. As used herein, a "security parameter" is information used by a computing device for at least one of cryptography, an authentication functionality, and any other security functionality of the computing device.

In some examples, processor 110 also includes a machine-readable storage medium 120 including instructions 122, 124, and 132. In some examples, storage medium 120 may also include additional instructions. In other examples, the functionality of any of instructions 122, 124, and 132 described below may be implemented in the form of electronic circuitry, in the form of executable instructions encoded on a machine-readable storage medium, or a combination thereof. As used herein, a "machine-readable storage medium" may be any electronic, magnetic, optical, or other physical storage device to contain or store information such as executable instructions, data, and the like. For example, any machine-readable storage medium described herein may be any of Random Access Memory (RAM), flash memory, a storage drive (e.g., a hard disk), a Compact Disc Read Only Memory (CD-ROM), and the like, or a combination thereof. Further, any machine-readable storage medium described herein may be non-transitory.

In the example of FIG. 1, computing device 100 further includes a remote security monitor 140. In such examples, monitor 140 may be disposed on or in computing device 100. In other examples, remote security monitor 140 may be disposed outside of and/or separate from computing device 100. In such examples, computing device 100 and monitor 140 may form at least a portion of a computing system. As used herein, a "security monitor" is an at least partially electronic device to monitor for security incidents and to indicate the detection of a security incident to a processor. As used herein, a "security incident" is an event affecting or otherwise related to a computing device or a component thereof that may, alone or in combination with at least one other event, increase the vulnerability of information stored on the computing device. For example, a security incident may be a change in a condition or configuration of a computing device or receipt of any signal by the computing device that may, alone or in combination with at least one other change or signal, increase the vulnerability of information stored on the computing device. Example security incidents may include, for example, actual or attempted physical tampering with, opening of, or probing of the computing device, environmental (e.g., temperature) and/or physical (e.g., movement, vibration, etc.) conditions of the computing device being outside of acceptable ranges, receipt of at least one signal that is part of an actual or suspected attack on the computing device (e.g., is a forged signal, a replayed signal, etc.), and the like. Also, in some examples, a security incident may be a change in a condition outside of the computing device that may increase the vulnerability of the computing device, such as a change in a condition in a room containing the computing device. In such examples, a remote security monitor of the computing device may be disposed outside of and separate from an enclosure of the computing device. In some examples, a security monitor may monitor at least one physical condition of the computing device and/or signals communicated to the computing device. Additionally, the indication of the detection of a security incident may be a signal requesting that the processor zeroize at least one security parameter stored on the processor.

In some examples, remote security monitor 140 is remote from processor 110. As used herein, a security monitor is "remote" from a processor if the security monitor is disposed outside of a package of the processor and is to communicate with the processor via at least one external pin of the processor and/or via a wireless communication interface of the processor. In some examples, remote security monitor 140 and processor 110 may be disposed on different printed circuit boards (PCBs) within computing device 100. In other examples, remote security monitor 140 may be disposed on a chassis of computing device 100, and/or on (e.g., inside or outside) an enclosure of computing device 100 in which processor 110 is disposed. Additionally, in some examples, remote security monitor 140 may be disposed outside of and separate from an enclosure or chassis of computing device 100.

In the example of FIG. 1, remote security monitor 140 may monitor computing device 100 for security incidents. For example, computing device 100 may include a container (e.g., a case, rack, cage, etc.) in which processor 110 is disposed, along with any other components of computing device 100. In such examples, security monitor 140 may monitor the physical security of the container for security incidents including, for example, any actual or attempted penetration or opening of the container. Security monitor 140 may also provide monitor signals 182 to processor 110 to inform processor 110 of whether security monitor 140 has detected a security incident.

In some examples, security monitor 140 may have an idle state and a zeroize state. As used herein, an "idle state" of a security monitor is a state in which no security incident has been detected (e.g., since the monitor was placed in the idle state, reset, turned on, etc.) and the security monitor periodically outputs an idle signal. In some examples, when security monitor 140 is in the idle state, security monitor 140 may periodically provide an idle signal to processor 110 as a monitor signal 182. In some examples, monitor 140 may provide idle signals at a rate of between about 10 Hz and 100 kHz. In other examples, monitor 140 may provide idle signals at a greater or lesser rate. Additionally, as used herein, a "zeroize state" of a security monitor is a state entered by the security monitor after detecting a security incident and in which the security monitor does not output any idle signal. In some examples, in response to detecting a security incident, security monitor 140 may indicate the detection of the security incident to processor 110 by providing a zeroize signal to processor 110 as monitor signal 182.

In the example of FIG. 1, instructions 122 may receive monitor signal 182 from remote security monitor 140. In some examples, processor 110 may include a communication interface to receive monitor signal 182 via at least one external pin of processor 110. In such examples, instructions 122 may receive monitor signal 182 via the communication interface.

After instructions 122 receive monitor signal 182, signal determination instructions 124 may determine if monitor signal 182 is an idle signal from remote security monitor 140, a zeroize signal from remote security monitor 140, or an invalid signal. In some examples, instructions 124 may determine that monitor signal 182 is an idle single from remote security monitor 140 if signal 182 includes information identifying the signal as an idle signal from monitor 140. Similarly, instructions 124 may determine that monitor signal 182 is a zeroize single from remote security monitor 140 if signal 182 includes information identifying the signal as a zeroize signal from monitor 140.

In some examples, the information identifying signal 182 as an idle or a zeroize signal may be any form of information that may be included in a signal 182. For example, instructions 124 may determine that signal 182 is an idle signal if signal 182 includes a bit pattern identifying signal 182 as an idle signal, and may determine that signal 182 is a zeroize signal if signal 182 includes a bit pattern identifying signal 182 as a zeroize signal. In other examples, remote security monitor 140 may periodically receive information from processor 110 and selectively modify and return the information in signal 182 as an idle or zeroize monitor signal 182. Additionally, in some examples, security monitor 140 may include information identifying itself in each monitor signal 182. In such examples, instructions 124 may determine from information in signal 182 if signal 182 is an idle signal from monitor 140 or a zeroize signal 182 from monitor 140.

In some examples, instructions 124 may determine that a monitor signal 182 received by instructions 122 is an invalid signal by determining that the received signal 182 is neither an idle signal nor a zeroize signal from monitor 140. For example, an attacker may replace monitor 140 with a false monitor to pose as monitor 140. In such examples, instructions 124 may determine that a signal received from the false monitor is an invalid signal when the signal does not contain information correctly identifying the signal as an idle or zeroize signal from remote security monitor 140. In other examples, computing device 100 may include a plurality of remote security monitors 140. In such examples, instructions 124 may determine that a monitor signal 182 received by instructions 122 is an invalid signal by determining that the received signal 182 is not an idle signal from any of the security monitors 140 of computing device 100 or a zeroize signal from any of the security monitors 140 of computing device 100. In other examples, remote security monitor 140 may communicate valid signals other than an idle or a zeroize signal. In such examples, instructions 124 may determine that a received signal is invalid if it determines that the received signal is not any type of valid signal of any remote security monitor 140 of computing device 100.

Additionally, in the example of FIG. 1, instructions 132 may zeroize security parameter 117 in secure parameter storage 115 if a threshold amount of time elapses without receiving an idle signal from remote security monitor 140. In some examples, instructions 132 may monitor an amount of time elapsed since an idle signal was last received from security monitor 140 and zeroize security parameter 117 if instructions 132 determine that the threshold amount of time has elapsed without receiving an idle signal from monitor 140.

In some examples, instructions 132 may track an amount of time elapsed since instructions 122 last received an idle signal from remote security monitor 140 as monitor signal 182. For example, instructions 132 may reset a timer each time instructions 122 receive the idle signal. In such examples, the timer may be reset if instructions 124 determine that the signal received by instructions 122 is an idle signal from monitor 140. In some examples, instructions 132 may monitor the timer to determine when a threshold amount of time has been reached without receiving an idle signal from monitor 140. In other examples, instructions 132 may determine when the threshold amount of time has been reached in other ways. For example, instructions 132 may compare a current time against the time at which the last idle signal was received from monitor 140.

By receiving periodic idle signals from monitor 140, processor 110 may determine both that it is connected to monitor 140 and that monitor 140 has not detected a security incident. For example, if monitor 140 is disabled or disconnected from processor 110, then instructions 122 may not receive the periodic idle signal from monitor 140. In such examples, by monitoring an amount of time elapsed without receiving an idle signal from remote security monitor 140, processor 110 may determine whether remote security monitor 140, or a connection between monitor 140 and processor 110, has been compromised.

After determining that the threshold amount of time has elapsed without receiving an idle signal from remote security monitor 140, instructions 132 may zeroize at least security parameter 117. As used herein, to "zeroize" information is to at least one of erase and overwrite the information at least once. In some examples, instructions 132 may zeroize security parameter 117 by overwriting each bit of security parameter 117 at least once. For example, instructions 132 may overwrite each bit of security parameter 117 with a first logic value (e.g., 0), then with a second logic value (e.g., 1), and then overwrite the security parameters with a combination of logic 1's and logic 0's. In other examples, instructions 132 may erase security parameter 117 and then take further action to prevent the recovery of the erased parameter 117, such as overwriting the erased parameters at least once, as described above, to complete the zeroization of the security parameters.

In some examples, instructions 132 may zeroize a plurality of security parameters 117 stored in secure parameter storage 115 in response to determining that the threshold amount of time has elapsed since receiving an idle signal from remote security monitor 140. Additionally, in some examples, instructions 132 may zeroize all of secure parameter storage 115, or a portion thereof, in response to determining that the threshold amount of time has elapsed since receiving an idle signal from remote security monitor 140. In the example of FIG. 1, processor 110 may execute instructions stored on storage medium 120 of processor 110. For example, the instructions may be executed by at least a CPU core module of processor 110 that may be separate from storage medium 120 within processor 110. In other examples, storage medium 120 may be disposed outside of processor 110.

In examples described above, a processor may determine that a remote security monitor has been disabled, or that a connection between the processor and the monitor has been disconnected or corrupted if a threshold amount of time elapses without receiving an idle signal from a remote security monitor. In such examples, the processor may zeroize security parameters stored thereon if it determines that the remote security monitor, or a connection between the monitor and processor, has been compromised. In this manner, examples described herein may protect security parameters stored on a processor of a computing device even if a remote security monitor of the computing device is removed, disconnected, or otherwise disabled. Such examples may be able to protect security parameters stored on a processor even when a remote security monitor is not able to inform the processor of security incidents.

Figure 2:
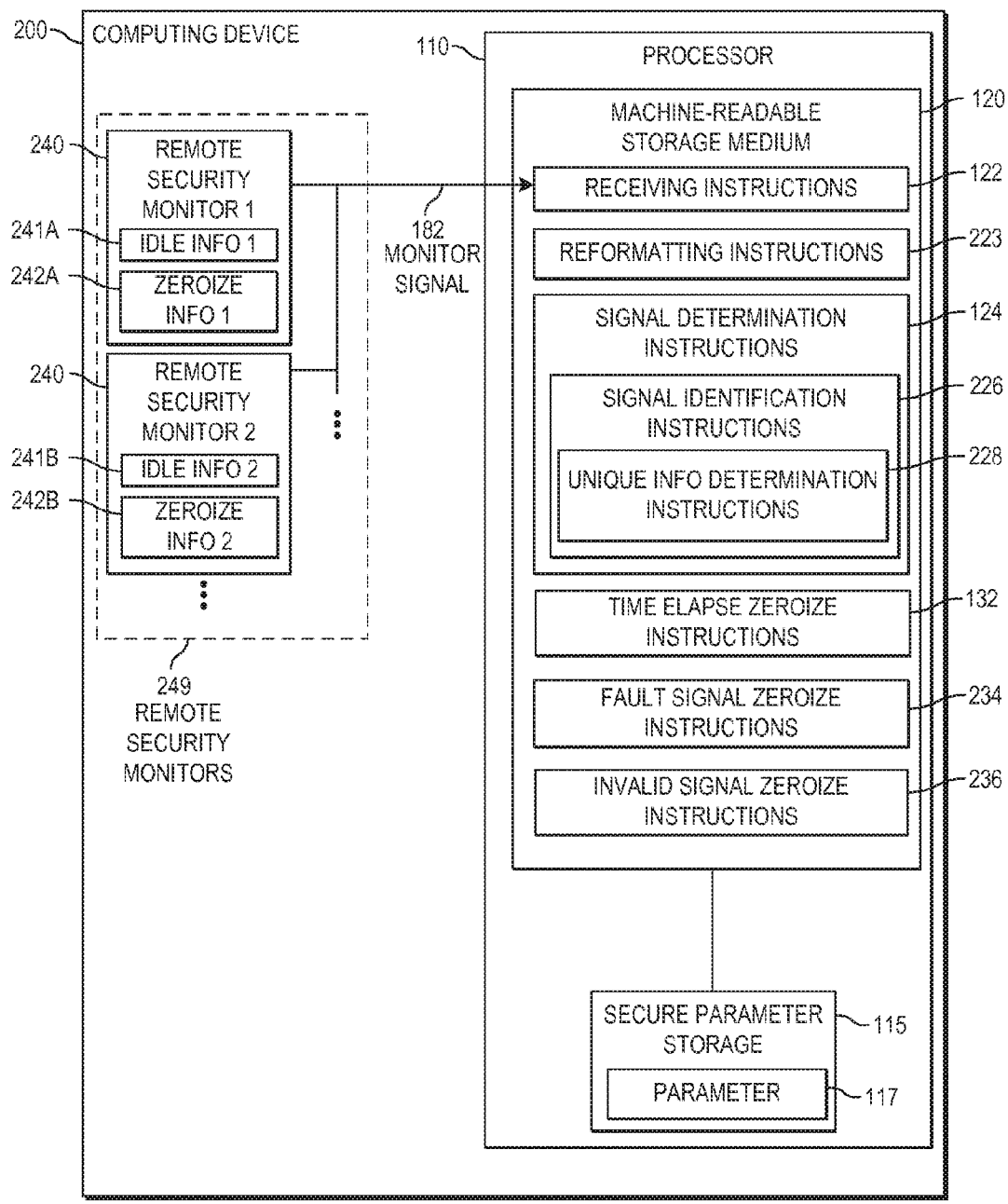
FIG. 2 is a block diagram of an example computing device to zeroize a security parameter based on a plurality of remote security monitors.

FIG. 2 is a block diagram of an example computing device 200 to zeroize a security parameter 117 based on a plurality 249 of remote security monitors 240. In the example of FIG. 2, computing device 200 comprises processor 110, which includes machine-readable storage medium 120, as described above in relation to FIG. 1. Processor 110 also includes secure parameter storage 115, which may store at least one security parameter 117. In the example of FIG. 2, computing device 200 also includes a plurality 249 of remote security monitors 240, each of which is remote from processor 110 and may provide monitor signals 182 to processor 110, as described above in relation to remote security monitor 140 of FIG. 1. In some examples, monitors 240 may be disposed on or in computing device 200. In other examples, at least one of remote security monitors 240 may be disposed outside of and/or separate from computing device 200. In such examples, computing device 200 and any external monitors 240 may form at least a portion of a computing system. In some examples, computing device 200 of FIG. 2 may perform any of the functionalities described above in relation to FIG. 1.

In the example of FIG. 2, storage medium 120 includes instructions 122, 124, and 132, as described above in relation to FIG. 1. Additionally, in some examples, storage medium 200 may also include instructions 223, 226, 228, 234, and 236. In some examples, the functionality of any of the instructions described in relation to storage medium 120 may be implemented in the form of electronic circuitry, in the form of executable instructions encoded on a machine-readable storage medium, or a combination thereof.

In the example of FIG. 2, computing device 200 includes a plurality 249 of remote security monitors 240. While two remote security monitors 240 are illustrated in FIG. 2, in some examples, computing device 200 may include one security monitor 240, or more than two security monitors 240. In some examples, each of remote security monitors 240 of FIG. 2 may perform the functionalities described above in relation to remote security monitor 140 of FIG. 1. For example, each of monitors 240 may provide idle and zeroize signals to processor 110 as monitor signals 182. In such examples, instructions 122 may receive monitor signals 182, as described above in relation to FIG. 1. In examples in which computing device 200 includes one security monitor 240, for each monitor signal 182 received by instructions 122, instructions 124 may determine if the received monitor signal 182 is an idle signal from the remote security monitor 240, a zeroize signal from the remote security monitor 240, or an invalid signal, as described above in relation to FIG. 1.

In examples including a plurality of security monitors 240, instructions 124 may include signal identification instructions 226. In such examples, for each monitor signal 182 received by instructions 122, instructions 226 may determine if the received monitor signal 182 is an idle signal from one of remote security monitors 240, a zeroize signal from one of remote security monitors 240, or an invalid signal, as described above in relation to FIG. 1. In such examples, instructions 132 may zeroize at least one security parameter 117 stored in secure parameter storage 115 if the threshold amount of time elapses without receiving an idle signal from one of remote security monitors 240. For example, the elapse of the threshold amount of time without receiving an idle signal from one of security monitors 240 may indicate that the security monitor 240 has been disabled, disconnected, or the like. In such examples, instructions 132 may track the amount of time between idle signals, as described above in relation to FIG. 1, for each of security monitors 240. In this manner, security parameters 117 may be zeroized if even one of monitors 240 has been compromised.

In the example of FIG. 2, instructions 234 may zeroize at least one security parameter 117 stored on secure parameter storage 115 in response to a determination of instructions 124 that a received monitor signal 182 is a zeroize signal from one of remote security monitors 240. In examples in which computing device 200 includes one remote security monitor 240, instructions 234 may zeroize at least one security parameter 117 in response to a determination of instructions 124 that a received monitor signal 182 is a zeroize signal from the remote security monitor 240. Additionally, in some examples, instructions 236 may zeroize at least one security parameter 117 stored on secure parameter storage 115 in response to a determination of instructions 124 that a received monitor signal 182 is an invalid signal. In some examples, instructions 234 and/or instructions 236 may zeroize a plurality of security parameters 117 stored in secure parameter storage 115. Additionally, in some examples, instructions 234 and/or instructions 236 may zeroize all of secure parameter storage 115, or a portion thereof.

In the example of FIG. 2, each of remote security monitors 240 may include unique idle information and unique zeroize information. For example, a first remote security monitor 240 may include idle information 241A and zeroize information 242A, and a second remote security monitor 240 may include idle information 241B and zeroize information 242B. In some examples, each security monitor 240 may include its unique idle information in its idle signals and include its unique zeroize information in its zeroize signals.

In such examples, instructions 226 may utilize the unique idle and zeroize information to identify idle and zeroize signals of remote security monitors 240. In some examples, instructions 226 may include unique information determination instructions 228. In such examples, for each monitor signal 182 received by instructions 122, instructions 228 may determine if the monitor signal includes unique idle information associated with one of remote security monitors 240, includes unique zeroize information associated with one of remote security monitors 240, or is an invalid signal. In some examples, instructions 228 may determine that a monitor signal 182 is an invalid signal if it does not include the unique idle or fault information of any of security monitors 240. In other examples, instructions 228 may determine that a monitor signal 182 is an invalid signal if it does not include the unique idle or fault information of any of security monitors 240, and is not any other type of valid signal from a security monitor 240. As used herein, idle or zeroize information of a security monitor of a computing device may be "unique" if it is different from all other idle information and zeroize information of the security monitors of the computing device.

In examples described herein, by unique idle and zeroize information, a processor may be able to distinguish the idle and zeroize signals of different security monitors. In this manner, a processor may be able to tell if a security monitor is removed, even if it is replaced with another device that outputs idle signals (e.g., by an attacker). In some examples described herein, when the processor does not receive an idle signal including the idle information of the removed monitor, the security parameters may be zeroized. Additionally, in examples described herein, a processor of a computing device may ignore a zeroize signal sent by an attacker if it does not include the zeroize information of any of the security monitors of the computing device. In this manner, examples described herein may prevent denial of service attacks in which an attacker attempts to zeroize the security parameters of the processor to disrupt the operation of the computing device.

Additionally, in the example of FIG. 2, monitor signals 182, or at least portions thereof, may be provided to processor 110 in a format other than cleartext. For example, monitor signals 182, or portions thereof, may be encoded (e.g., compressed), encrypted, or the like, so that monitor signals 182 may not be readily interpreted and/or forged by a non-trusted party (e.g., an attacker). For example, monitor signals 182 including unique idle and zeroize information may be encrypted to protect the secrecy of the information. In such examples, reformatting instructions 223 may reformat at least a portion of each monitor signal 182 received by instructions 122. For example, instructions 223 may reformat at least a portion of each signal 182 from a format in which the signal was received into a cleartext format. In such examples, instructions 223 may reformat information in any suitable manner.

For example, monitor signals 182, or portions thereof, may be encrypted. In such examples, instructions 223 may decrypt at least a portion of each of monitor signals 182 received by instructions 122. In other examples, monitor signals 182, or portions thereof, may be compressed or otherwise encoded. In such examples, instructions 223 may decompress or otherwise decode at least a portion of each of monitor signals 182 received by instructions 122. Additionally, in some examples, instructions 124 may determine whether received monitor signals 182 are idle, zeroize, or invalid signals based on the monitor signals 182 as wholly or partially reformatted by instructions 223. In such examples, for each received monitor signal 182, instructions 124 may make the determinations described above after instructions 223 wholly or partially reformat the signal.

Figure 3:
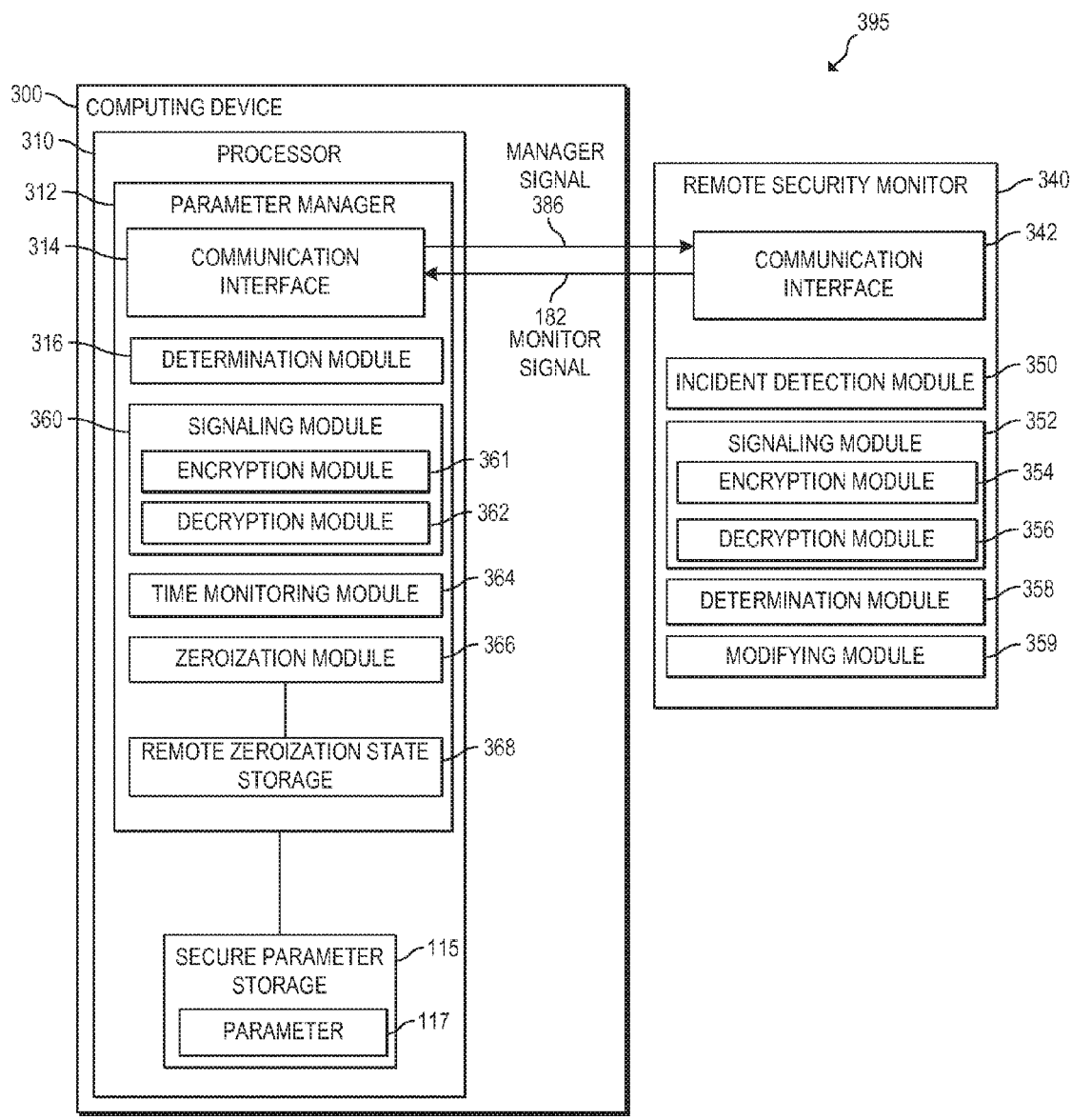
FIG. 3 is a block diagram of an example computing system to zeroize a security parameter based on communications with a remote security monitor.

FIG. 3 is a block diagram of an example computing system 395 to zeroize a security parameter 117 based on communications with a remote security monitor 340. In the example of FIG. 3, computing system 395 includes a computing device 300 and a remote security monitor 340. Computing device 300 may include a processor 310 comprising a parameter manager 312 and secure parameter storage 115, which may store at least one security parameter 117. In some examples, computing device 300 may include an enclosure (e.g., a case or other container), and processor 310 may be disposed inside of the enclosure along with other components of computing device 300. In the example of FIG. 3, remote security monitor 340 may be disposed outside of and separate from the enclosure. In other examples, remote security monitor 340 may be disposed on and/or inside the enclosure of computing device 300.

In the example of FIG. 3, parameter manager 312 may include a communication interface 314, remote zeroization state storage 368, and modules 316, 360, 361, 362, 364, and 366. In some examples, the functionality of modules 316, 360, 361, 362, 364, and 366 may each be implemented in the form of executable instructions encoded on a machine-readable storage medium, in the form of electronic circuitry, or a combination thereof. In some examples, remote security monitor 340 may be remote from processor 310, and may include a communication interface 342, and modules 350, 352, 354, 356, 358, and 359. In some examples, the functionality of modules 350, 352, 354, 356, 358, and 359 may each be implemented in the form of executable instructions encoded on a machine-readable storage medium, in the form of electronic circuitry, or a combination thereof. As used herein, a "communication interface" is a device or module that may be used for communication between computing device components. In some examples, communication interfaces 314 and 342 may communicate with each other by sending signals over at least one physical element (e.g., wires, leads, traces, pins, etc.) connecting the interfaces. In other examples, communication interfaces 314 and 342 may be wireless interfaces that may communicate with each other wirelessly. For example, interfaces 314 and 342 may communicate wirelessly in examples in which monitor 340 is disposed outside of and separate from an enclosure of computing device 300.

In some examples, signaling module 360 may periodically provide a manager signal 386 to remote security monitor 340. For example, module 360 may provide manager signals 386 at a rate of between about 10 Hz and 100 kHz. In other examples, module 360 may provide manager signals 386 at a greater or lesser rate. In some examples, module 360 may provide manager signals 386, with communication interface 314, to communication interface 342 of security monitor 340. In some examples, module 360 may include manager information. In such examples, the manager information may be, for example, a particular bit pattern, or any other type of information. In some examples, determination module 358 of monitor 340 may determine the manager information from received manager signals 386.

In the example of FIG. 3, remote security monitor 340 includes an incident detection module 350. In some examples, module 350 may monitor computing device 300 for security incidents, as described above in relation to FIG. 1. Monitor 340 may have idle and zeroize states, as described in relation to FIG. 1. Additionally, monitor 340 may also include a signaling module 352. In some examples, module 352 may receive manager signals 386 from parameter manager 312 via communication interface 342. In such examples, in response to receiving a manager signal 386, module 352 may provide a monitor signal 182 to parameter manager 312 via communication interface 342.

In some examples, module 352 may include information in signal 182 to identify the signal as either an idle signal or a zeroize signal. For example, if module 350 has not detected a security incident (i.e., is still in the idle state) then module 352 may provide to parameter manager 312 a monitor signal 182 including the received manager information, without modification, to indicate an idle state to parameter manager 312. In such examples, module 360 may receive the monitor signal 182 including the unmodified manager information, and determination module 316 of parameter manager 312 may determine that signal 182 is an idle signal indicating an idle state of monitor 340. Based on the receipt of the idle signal, determination module 316 may determine that monitor 340 is functioning, connected, and has not detected a security incident. Parameter manager 312 may periodically provide manager signals 386 to monitor 340 while monitor 340 indicates that it is in the idle state.

In some examples, parameter manager 312 also includes a time monitoring module 364 to track an amount of time elapsed after outputting a manager signal 386 including the manager information. In such examples, module 364 may track the time using a timer, by comparing a current time to a time at which signal 386 was sent, as described above in relation to FIG. 1, or the like. In some examples, time monitoring module 364 may determine to zeroize parameters 117 if it determines that, after outputting manager signal 386 including the manager information, a threshold amount of time has elapsed without receiving a signal 182 including the unmodified manager information. In this manner, module 364 may determine that a threshold amount of time has elapsed without receiving an idle signal in response to manager signal 386, and determine to zeroize parameters 117 in response. In response to any determination to zeroize made by module 316, zeroization module 366 may zeroize at least one security parameter 117 stored in secure parameter storage 115, as described above in relation to FIG. 1. In other examples, in response to a determination to zeroize, module 366 may zeroize all or at least a portion of parameter storage 115.

In this manner, parameter manager 312 may continually test the connection of processor 310 and monitor 340 and the functioning of monitor 340. If monitor 340 is disconnected, the connection is corrupted, or monitor 340 has been disabled, then parameter manager 312 may not receive an idle signal including the manager information as signal 182 in response to manager signal 386. In such examples, parameter manager 312 may detect the problem and zeroize at least one security parameter 117 to protect the parameters. In some examples, module 360 may reduce the likely success of replay attacks by including different manager information in successive manager signals 386. In such examples, each signal 386 may include different manager information, module 360 may cycle through a set of manager information, periodically change the manager information, or the like.

If module 350 detects a security incident (i.e., transitions to the zeroize state) then modifying module 359 may modify the manager information received in manager signal 386 to request zeroization of at least one security parameter 117 of parameter storage 115. In some examples, module 359 may modify the manager information in a manner known to parameter manager 312 to indicate a zeroization request. After modifying the manager information, module 352 may provide to parameter manager 312 a monitor signal 182 including the modified manager information to request zeroization of at least one security parameter 117. In such examples, module 360 may receive the monitor signal 182 including the modified manager information, and determination module 316 may determine that signal 182 is a zeroization signal indicating that monitor 340 has detected a security incident.

In such examples, module 360 may receive the monitor signal 182 and determining module 316 may determine that signal 182 includes the manager information modified to request zeroization, and thus determine that the signal 182 is a zeroize signal. In some examples, module 316 may determine to zeroize at least one security parameter 117 stored in secure parameter storage 115 in response to receiving a signal 182 including the first manager information modified to request zeroization. In response to the determination to zeroize, zeroization module 366 may zeroize at least one security parameter 117 stored in secure parameter storage 115. In some examples, zeroization module 366 may zeroize all or part of secure parameter storage 115 in response to the determination to zeroize.

In some examples, determination module 316 may also determine to zeroize security parameters 117 if module 316 determines that a received monitor signal 182 is an invalid signal. For example, module 316 may determine that monitor signal 182 is an invalid signal if it includes neither the unmodified manager information provided in manager signal 386, nor the manager information modified to request zeroization. In response to a determination to zeroize made by module 316, zeroization module 366 may zeroize at least one security parameter 117, as described above. In some examples, determination module 316 may also determine that the invalid signal indicates that a connection between processor 310 and remote security monitor 340 is unreliable (e.g., loose, noisy, partially disconnected, etc.). For example, a received signal 182 including asynchronous oscillations between logic 1 and logic 0 may indicate a poor connection between processor 310 and monitor 340. In such examples, module 316 may determine that the invalid signal with asynchronous oscillations indicates a poor connection. In some examples, module 316 may determine to zeroize security parameters 117 in response.

In addition, the manager information may be periodically changed, so that a single 182 including an old version of the unmodified or modified manager information may be considered invalid information. In this manner, examples disclosed herein may protect against a false security monitor from successfully replaying previously valid monitor signals 182. For example, parameter manger 312 may provide to monitor 340 a first manager signal 368 including first manager information, and receive back from monitor 340 a monitor signal 182 including the unmodified first manager information indicating the idle state. In such examples, parameter manger 312 may subsequently provide to monitor 340 a second manager signal 368 including second manager information different than the first manager information. In some examples, time monitoring module 364 may track the time elapsed since outputting the second manager signal 368. If, after outputting the second manager signal, module 364 determines that the threshold amount of time has elapsed without receiving a signal including the second manager information, then determination module 316 may determine to zeroize security parameters 117 of secure parameter storage 115. In such examples, zeroization module 366 may zeroize the parameters 117 in response to the determination.

In the example of FIG. 3, parameter manager 312 may include remote zeroization state storage 368. In some examples, storage 368 may store a state value indicating whether remote zeroization is enabled. In such examples, zeroization in response to a monitor 340 remote from processor 310 may be enabled if storage 368 stores a first value, and may be disabled if storage 368 stores a second value. In some examples, if the state value indicates that remote zeroization is disabled, zeroization module 366 may prevent the zeroization of any security parameters 117 stored in secure parameter storage 115 in response to any signal received from outside of processor 310. Also, in some examples, if the state value indicates that remote zeroization is disabled, zeroization module 366 may prevent the zeroization of any security parameters 117 stored in secure parameter storage 115 in accordance with a failure to receive a signal from outside of the processor, if the state value indicates that remote zeroization is disabled. In such examples, zeroization module 366 may ignore any zeroization determination made by determination module 316 if the state value stored in storage 368 indicates that remote zeroization is disabled. In such examples, zeroization module 366 may zeroize security parameters 117 in response to a determination of module 316 if the state value stored in storage 368 indicates that remote zeroization is enabled.

In some examples, signaling module 360 of parameter manager 312 may include an encryption module 361 and a decryption module 362, and signaling module 352 of monitor 340 may include an encryption module 354 and a decryption module 356. In such examples, encryption module 361 may encrypt manager information included in manager signal 386 by signaling module 360. In some examples, signaling module 352 may receive the manager signal 368 including the encrypted manager information, and decryption module 356 may decrypt all or a portion (e.g., the first manager information) of the received manager signal 386. The first manager information may then be determined from the decrypted signal 386. In some examples, determination module 358 may determine manager information from manager signals 386.

If no security incident is detected, then module 352 may provide parameter manager 312 with a monitor signal 182 including the unmodified manager information, as described above. In such examples, encryption module 354 may encrypt at least the first manager information to be included in monitor signal 182. In other examples, the entire monitor signal 182, including the first manager information, may be encrypted by module 354 before being provided to parameter manager 312.

In other examples, if module 350 has detected a security incident, then module 352 may provide parameter manager 312 with a monitor signal 182 including modified manager information, as described above. In such examples, encryption module 354 may encrypt at least the modified first manager information to be included in monitor signal 182. In other examples, the entire monitor signal 182, including the modified manager information, may be encrypted by module 354 before being provided to parameter manager 312. In some examples, encryption modules 361 and 354 may encrypt information in the same way. In other examples, encryption modules 361 and 354 may encrypt information differently. For example, modules 361 and 354 may use different keys in the same encryption process, or may use different encryption processes.

Signaling module 360 may receive monitor signal 182 including the encrypted modified or unmodified manager information. In some examples, decryption module 362 may decrypt at least a portion of the received monitor signal 182 (e.g., at least a portion potentially including manager information). After decrypting at least a portion of the received signal 182, determination module may determine whether the decrypted signal 182 includes the unmodified manager information or modified manager information.

By encrypting at least the manager information portion of manager signals 386 and monitor signals 182, examples described herein may protect the secrecy of the manager information, as well as the manner in which manager information may be modified to indicate a zeroize state, for example. In this manner, examples described herein may make it difficult to forge manager and monitor signals. In some examples, the encryption and decryption functionalities of signaling modules 360 and 352 may be utilized in combination with any other functionalities described herein in relation to FIG. 3.

In some examples, communication interface 314 of parameter manager 312 may be a wireless communication interface, and communication interface 342 of remote security monitor 340 may be a wireless communication interface. In such examples, the wireless communication interface 314 may provide manager signals 386 to communication interface 342 of monitor 340 wirelessly, and receive monitor signals 182 from monitor 340 wirelessly. In such examples, wireless communication interface 342 may receive manager signals 386 wirelessly from parameter manager 312 and may provide monitor signals 182 to parameter manager 312 wirelessly.

Additionally, computing device 300 may include a plurality of remote security monitors 340, and parameter manager 312 may interact with each as described above in relation to monitor 340. In some examples, monitor 340 may also monitor the time elapsed between receiving manager signals 386 from processor 310. In such examples, if a threshold amount of time elapses without receiving a manager signal 386, monitor 340 may determine that processor 310 or a connection with processor 310 has been compromised. In some examples, monitor 340 may disable itself (e.g., zeroize its memory) so that an attacker may not use monitor 340 to attack another computing device. Also, in some examples, any of the functionalities described above in relation to FIG. 3 may be used in combination with any of the functionalities described above in relation to FIGS. 1 and 2 and/or below in relation to FIGS. 4 and 5.

Figure 4:
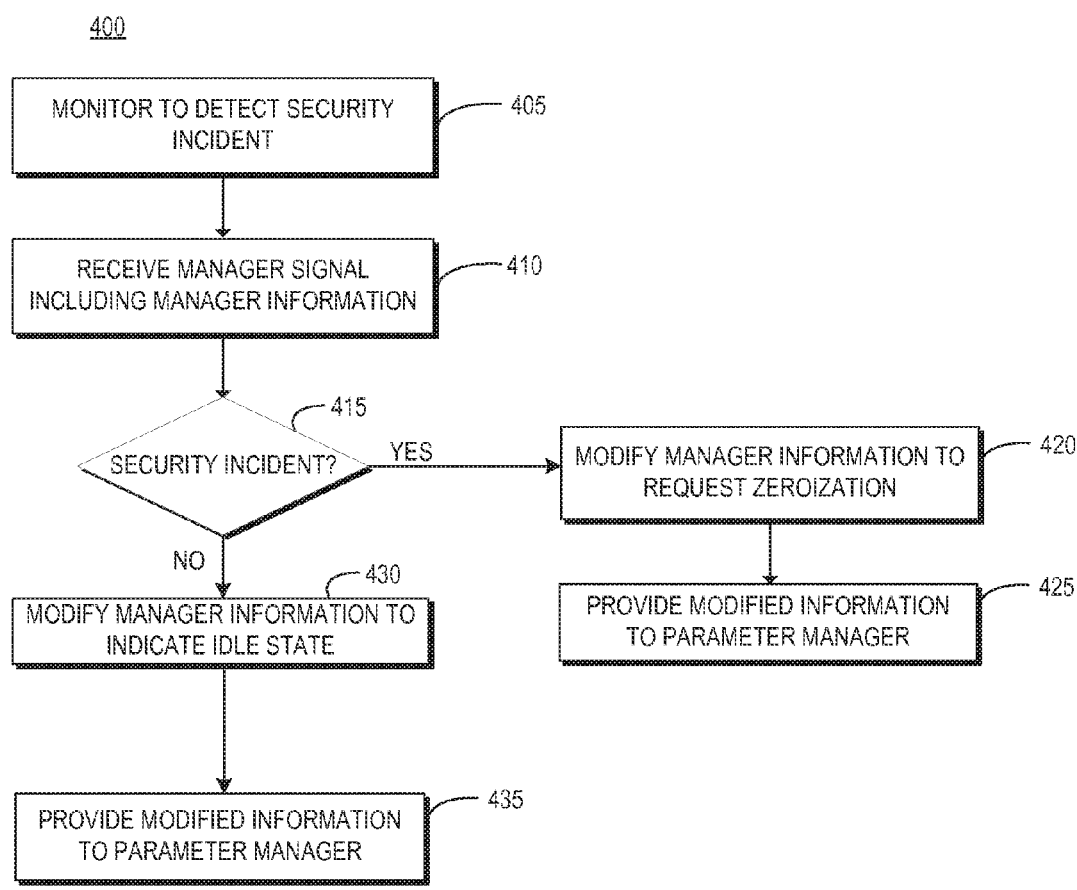
FIG. 4 is a flowchart of an example method for communicating a security signal with a remote security monitor.

FIG. 4 is a flowchart of an example method 400 for communicating a security signal with a remote security monitor. Although execution of method 400 is described below with reference to remote security monitor 340 of FIG. 3, other suitable components for execution of method 400 can be utilized (e.g., remote security monitor 140 or 240). Additionally, method 400 may be implemented in the form of executable instructions encoded on a machine-readable storage medium, in the form of electronic circuitry, or a combination thereof.

At 405 of method 400, remote security monitor 340 may perform monitoring to detect security incidents, as described above in relation to FIG. 1. For example, monitor 304 may monitor computing device 300 or at least one condition affecting computing device 300 to detect security incidents. At 410, security monitor 340 may receive, from a processor 310 of the computing device, a manager signal including manager information. In such examples, security monitor 340 is remote from processor 310.

After receiving the manager signal, remote security manager 340 may determine, at 415 of method 400, whether a security incident has been detected. If no security incident is detected, method 400 may proceed to 430, where security monitor 340 may modify the manager information included in the manager signal to indicate an idle state of monitor 340. After modifying the manager information to indicate the idle state, monitor 340 may, at 435 of method 400, provide to processor 310 a monitor signal including the manager information modified to indicate the idle state.

If it is determined at 415 that a security incident is detected, method 400 may proceed to 420, where security monitor 340 may modify the manager information included in the manager signal to indicate a zeroize state of monitor 340 and/or request zeroization of at least one security parameter of secure parameter storage of processor 310. After modifying the manager information to request zeroization, monitor 340 may provide to processor 310 a monitor signal including the manager information modified to request zeroization to cause processor 310 to zeroize the security parameters stored in processor 310. In such examples, by providing the modified manager information to the processor, the manager signal including the modified manager information may cause the processor to zeroize at least one security parameter 117 of parameter storage 115 if a security incident is detected. By modifying manager information both to indicate the idle state and to request zeroization, a processor in examples described herein may determine that a previously valid idle signal is invalid if replayed layer. In this manner, embodiments described herein may be less vulnerable to an attack in which a previously valid idle signal is replayed to the processor.

Figure 5:
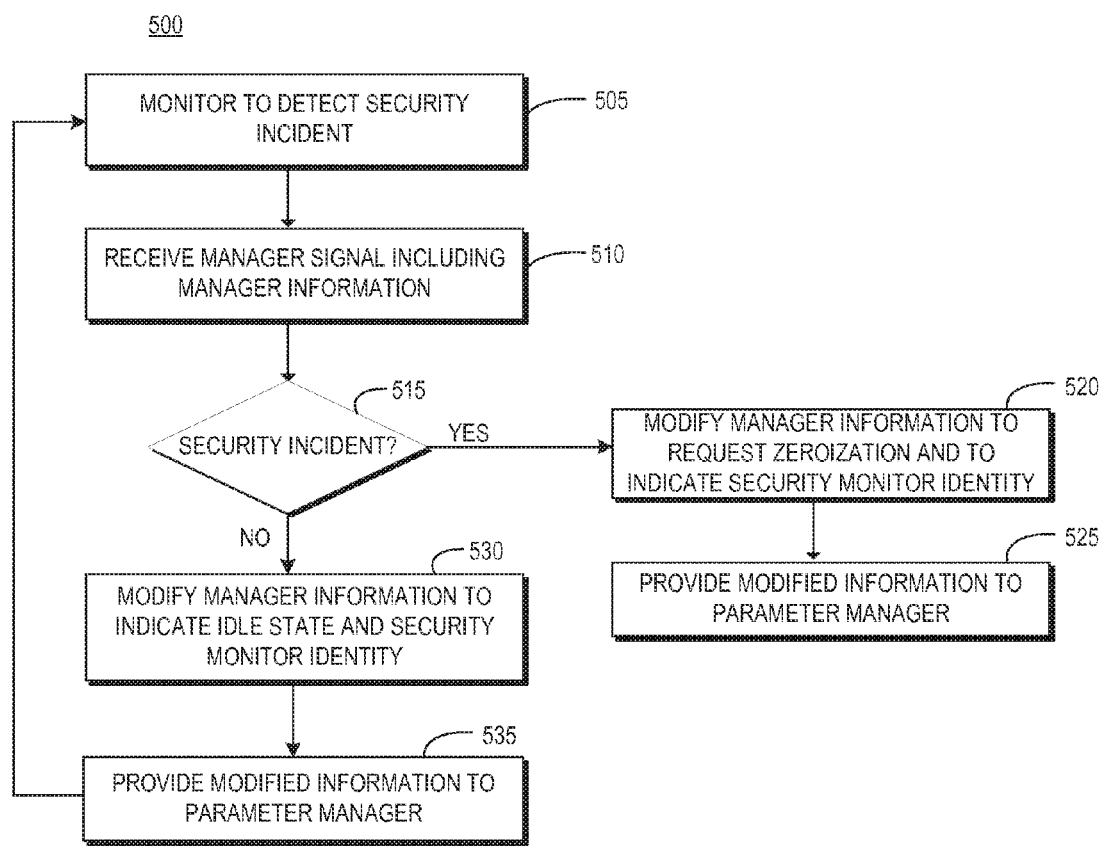
FIG. 5 is a flowchart of an example method for communicating a security signal based on the detection of a security incident.

FIG. 5 is a flowchart of an example method 500 for communicating a security signal based on the detection of a security incident. Although execution of method 500 is described below with reference to remote security monitor 340 of FIG. 3, other suitable components for execution of method 500 can be utilized (e.g., remote security monitor 140 or 240). Additionally, method 500 may be implemented in the form of executable instructions encoded on a machine-readable storage medium, in the form of electronic circuitry, or a combination thereof.

At 505 of method 500, remote security monitor 340 may perform monitoring to detect security incidents, as described above in relation to FIG. 1. At 510, security monitor 340 may receive, from a processor 310 of the computing device, a first manager signal including first manager information. In such examples, security monitor 340 is remote from processor 310.

After receiving the first manager signal, remote security manager 340 may determine, at 515 of method 500, whether a security incident has been detected. If it is determined at 515 that a security incident is detected, method 500 may proceed to 520, where security monitor 340 may modify the first manager information included in the first manager signal to indicate a zeroize state of monitor 340 and/or request zeroization of at least one security parameter of secure parameter storage of processor 310. In some examples, computing device 300 may include a plurality of remote security monitors 340, and each may modify manager information in a different manner to indicate its identity. For example, each monitor 340 may flip a different bit of the manager information. Additionally, any of the remote security monitors of the examples described above in relation to FIGS. 1-4 may modify manager information to indicate monitor identity.

After modifying the first manager information, monitor 340 may, at 525 of method 500, provide to processor 310 a first monitor signal including the first manager information modified to request zeroization to cause processor 310 to zeroize the security parameters stored in processor 310. In such examples, by providing the first modified manager information to the processor, the first manager signal including the modified first manager information may cause the processor to zeroize at least one security parameter 117 of parameter storage 115 if a security incident is detected. In examples disclosed herein, a processor receiving monitor signals may determine from the modifications to the manager information both the identity of the sending monitor and whether the monitor has detected a security incident.

Alternatively, if no security incident is detected at 515, method 500 may proceed to 530, where security monitor 340 may modify the first manager information included in the first manager signal to indicate an idle state of monitor 340 and to indicate an identity of the remote security monitor 340. After modifying the first manager information to indicate the idle state and the identity of monitor 340, monitor 340 may, at 535 of method 500, provide to processor 310 a first monitor signal including the first manager information modified to indicate the idle state and the identity of monitor 340.

After providing the first manager information modified to indicate the idle state to processor 310, method 500 may proceed to 505 to again perform monitoring to detect security incidents. At 510, security monitor 340 may receive, from processor 310, a second manager signal including second manager information.

After receiving the second manager signal, remote security manager 340 may determine, at 515 of method 500, whether a security incident has been detected. If it is determined at 515 that a security incident is detected, method 500 may proceed to 520, where security monitor 340 may modify the second manager information included in the second manager signal to indicate a zeroize state of monitor 340 and/or request zeroization of at least one security parameter of secure parameter storage of processor 310.

After modifying the second manager information, monitor 340 may, at 525 of method 500, provide to processor 310 a second monitor signal including the second manager information modified to request zeroization to cause processor 310 to zeroize the security parameters stored in processor 310. In such examples, by providing the second modified manager information to the processor, the second manager signal including the modified second manager information may cause the processor to zeroize at least one security parameter 117 of parameter storage 115 if a security incident is detected.

Alternatively, if no security incident is detected at 515, method 500 may proceed to 530, where security monitor 340 may modify the second manager information included in the second manager signal to indicate an idle state of monitor 340 and to indicate an identity of the remote security monitor 340. After modifying the second manager information to indicate the idle state and the identity of monitor 340, monitor 340 may, at 535 of method 500, provide to processor 310 a second monitor signal including the second manager information modified to indicate the idle state and the identity of monitor 340. After providing the second monitor signal indicating the idle state, method 500 may return to 505.

What is claimed is:

1. A non-transitory machine-readable storage medium encoded with instructions executable by a processor, the storage medium comprising:

instructions to provide a manager signal including manager information to a remote security monitor;

instructions to receive a monitor signal;

signal determination instructions to determine if the monitor signal is (i) an idle signal from the remote security monitor, the idle signal including an unmodified version of the manager information, or (ii) a zeroize signal from the remote security monitor, the zeroize signal including a modified version of the manager information, wherein the remote security monitor is remote from the processor; and instructions to zeroize a security parameter stored in secure parameter storage if a threshold amount of time elapses without receiving the idle signal from the remote security monitor.

2. The non-transitory machine-readable storage medium of claim 1, further comprising:

instructions to zeroize the security parameter in response to a determination that the monitor signal is the zeroize signal; or instructions to zeroize the security parameter in response to a determination that the monitor signal is an invalid signal.

3. The non-transitory machine-readable storage medium of claim 2, wherein the remote security monitor is one of a plurality of remote security monitors, wherein:

each remote security monitor of the plurality of remote security monitors is remote from the processor;

the signal determination instructions comprise:

signal identification instructions to determine if the monitor signal is the idle signal from one of the plurality of remote security monitors, the zeroize signal from one of the plurality of remote security monitors, or the invalid signal; and the instructions to zeroize the security parameter comprise:
instructions to zeroize the security parameter if the threshold amount of time elapses without receiving the idle signal from one of the plurality of remote security monitors.

4. The non-transitory machine-readable storage medium of claim 3, wherein:
each remote security monitor of the plurality of remote security monitors is associated with unique idle information and unique zeroize information; and
the signal identification instructions comprise:
unique information determination instructions to determine if the monitor signal includes the unique idle information associated with one of the plurality of remote security monitors, includes the unique zeroize information associated with one of the plurality of remote security monitors, or is the invalid signal.

5. The non-transitory machine-readable storage medium of claim 4, further comprising:
instructions to reformat at least a portion of the monitor signal, wherein the signal identification instructions are to determine, from the reformatted monitor signal, if the monitor signal is the idle signal from one of the plurality of remote security monitors, the zeroize signal from one of the plurality of remote security monitors, or the invalid signal.

6. A computing system, comprising:
a processor of a computing device, the processor including:
secure parameter storage to store at least one security parameter; and
a parameter manager to output a first manager signal including first manager information; and
a remote security monitor, remote from the processor, to:
detect a security incident;
receive the first manager signal from the parameter manager;
provide, to the parameter manager, a first monitor signal including the first manager information to indicate an idle state, if no security incident is detected;
wherein the parameter manager is further to:
zeroize the at least one security parameter of the secure parameter storage if, after outputting the first manager signal, a threshold amount of time elapses without receiving a signal including the first manager information.

7. The computing system of claim 6, wherein:
the remote security monitor is further to:
modify the first manager information of the first manager signal to request zeroization of the at least one security parameter if a security incident is detected; and
provide, to the parameter manager, a second monitor signal including the modified first manager information; and
the parameter manager is further to:
zeroize the at least one security parameter of the secure parameter storage in response to receiving a signal including the modified first manager information.

8. The computing system of claim 7, wherein the processor comprises:

remote zeroization state storage to store a state value indicating whether remote zeroization is enabled;
wherein the parameter manager is further to:
prevent the zeroization of any security parameters stored in the secure parameter storage in response to any signal received from outside of the processor, if the state value indicates that remote zeroization is disabled; or
prevent the zeroization of any security parameters stored in the secure parameter storage in accordance with a failure to receive a signal from outside of the processor, if the state value indicates that remote zeroization is disabled.

9. The computing system of claim 7, wherein the parameter manager is further to:
output a second manager signal including second manager information different than the first manager information;
zeroize the at least one security parameter of the secure parameter storage if, after outputting the second manager signal, the threshold amount of time elapses without receiving a signal including the second manager information;
determine that a received signal is an invalid signal; and
determine that the invalid signal indicates that a connection between the processor and the remote security monitor is unreliable.

10. The computing system of claim 7, wherein:
the parameter manager is further to:
encrypt at least the first manager information included in the first manager signal;
decrypt at least a portion of a signal received by the parameter manager; and
determine whether the decrypted signal includes the first manager information; and
the remote security monitor is further to:
decrypt at least a portion of the first manager signal, wherein the first manager information is at least part of the decrypted first manager signal; and
encrypt at least the first manager information included in the first monitor signal; and
encrypt at least the modified first manager information included in the second manager signal.

11. The computing system of claim 10, wherein:
the parameter manager is to encrypt information differently than the remote security monitor;
the processor is disposed in an enclosure of the computing device; and
the remote security monitor is disposed outside of and separate from the enclosure.

12. The computing system of claim 6, wherein:
the parameter manager is to output the first manger signal via a first wireless communication interface; and
the remote security monitor is to:
receive the first manager signal via a second wireless communication interface; and
provide the first monitor signal to the parameter manager via the second wireless communication interface.

13. A method, comprising:
monitoring, with a remote security monitor, to detect a security incident;
receiving, with the security monitor, a first manager signal including first manager information from a processor, wherein the security monitor is remote from the processor;

modifying the first manager information with the security monitor to indicate an idle state, if no security incident is detected;

modifying the first manager information with the security monitor to request zeroization of at least one security parameter stored in secure parameter storage of the processor, if a security incident is detected; and providing a first monitor signal including the modified first manager information from the remote security monitor to the processor to cause the processor to zeroize the at least one security parameter if a security incident is detected.

14. The method of claim 13, wherein:

modifying the first manager information to indicate the idle state comprises modifying the first manager information, with the remote security monitor, to indicate the idle state and to indicate an identity of the remote security monitor; and modifying the first manager information to request zeroization comprises modifying the first manager information, with the remote security monitor, to request zeroization and to indicate the identity of the remote security monitor.

15. The method of claim 13, further comprising:

receiving, with the remote security monitor, a second manager signal from the processor, after providing the first monitor signal including the modified first manager information indicating the idle state;

modifying second manager information included in the second manager signal, with the remote security monitor, to indicate the idle state, if no security incident is detected;

modifying the second manager information, with the remote security monitor, to request zeroization, if a security incident is detected; and providing a second monitor signal including the modified second manager information from the remote security monitor to the parameter manager.

* * * * *